US012079967B2

(12) United States Patent
Xu et al.

(10) Patent No.: US 12,079,967 B2
(45) Date of Patent: Sep. 3, 2024

(54) IMAGE PROCESSING METHOD AND SYSTEM, AND COMPUTER READABLE STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 421 days.

(21) Appl. No.: 17/641,435

(22) PCT Filed: Apr. 25, 2021

(86) PCT No.: PCT/CN2021/089489
§ 371 (c)(1),
(2) Date: Mar. 9, 2022

(87) PCT Pub. No.: WO2021/227838
PCT Pub. Date: Nov. 18, 2021

(65) Prior Publication Data
US 2022/0301115 A1 Sep. 22, 2022

(30) Foreign Application Priority Data
May 13, 2020 (CN) .......................... 202010404269.1

(51) Int. Cl.
*G06T 5/73* (2024.01)
*G06T 3/40* (2006.01)
(Continued)

(52) U.S. Cl.
CPC ................. *G06T 5/73* (2024.01); *G06T 3/40* (2013.01); *G06T 5/20* (2013.01); *G06T 5/90* (2024.01);
(Continued)

(58) Field of Classification Search
CPC .... G06T 5/73; G06T 3/40; G06T 5/20; G06T 5/90; G06T 7/11; G06T 7/13;
(Continued)

(56) References Cited

U.S. PATENT DOCUMENTS

2009/0034868 A1* 2/2009 Rempel ................ G09G 3/3426
382/274
2018/0157907 A1 6/2018 Loginov et al.
2021/0211556 A1* 7/2021 Hirayama .......... H04N 1/40062

FOREIGN PATENT DOCUMENTS

CN 104715445 6/2015
CN 105303190 2/2016
(Continued)

OTHER PUBLICATIONS

"International Search Report (Form PCT/ISA/210) of PCT/CN2020/1364594," mailed on Jul. 28, 2020, with English translation thereof, pp. 1-4.
(Continued)

*Primary Examiner* — Ping Y Hsieh
*Assistant Examiner* — Vaisali Rao Koppolu
(74) *Attorney, Agent, or Firm* — JCIP GLOBAL INC.

(57) ABSTRACT

An image processing method and system, and a computer readable storage medium. The method comprises: obtaining an image to be processed (S101); performing grayscale processing on the image to be processed to obtain a grayscale image, and performing blurring processing on the image to be processed to obtain a first blurred image (S102); performing binarization processing on the image to be processed according to the grayscale image and the first blurred image to obtain a binarized image (S103); performing expansion processing on grayscale values of high-value pixel points in the binarized image to obtain an expanded image (S104); performing sharpening processing on the expanded image to obtain a sharp image (S105); adjusting
(Continued)

the contrast of the sharp image to obtain a contrast image (S106); and using the grayscale image as a guided image to perform guided filter processing on the contrast image to obtain a target image (S107).

16 Claims, 11 Drawing Sheets

(51) Int. Cl.
    *G06T 5/20*     (2006.01)
    *G06T 5/90*     (2024.01)
    *G06T 7/11*     (2017.01)
    *G06T 7/13*     (2017.01)

(52) U.S. Cl.
    CPC ............... *G06T 7/11* (2017.01); *G06T 7/13* (2017.01); *G06T 2207/20021* (2013.01)

(58) Field of Classification Search
CPC . G06T 2207/20021; G06T 2207/10008; G06T 2207/20192; G06T 5/70
See application file for complete search history.

(56) References Cited

FOREIGN PATENT DOCUMENTS

| CN | 109785264 | | 5/2019 | |
|---|---|---|---|---|
| CN | 111583157 | | 8/2020 | |
| CN | 111915497 | A * | 11/2020 | ............ G06T 5/001 |

OTHER PUBLICATIONS

"Written Opinion of the International Searching Authority (Form PCT/ISA/237) of PCT/CN2020/136459," mailed on Jul. 28, 2021, pp. 1-4.

* cited by examiner

IMAGE PROCESSING METHOD AND SYSTEM, AND COMPUTER READABLE STORAGE MEDIUM

CROSS-REFERENCE TO RELATED APPLICATION

This application is a 371 of international application of PCT application serial no. PCT/CN2021/089489, filed on Apr. 25, 2021, which claims the priority benefit of China application no. 202010404269.1, filed on May 13, 2020. The entirety of each of the above mentioned patent applications is hereby incorporated by reference herein and made a part of this specification.

TECHNICAL FIELD

The disclosure relates to the technical field of digital image processing, in particular, to an image processing method and system and a computer readable storage medium.

DESCRIPTION OF RELATED ART

In recent years, with the rapid development of digital image processing technology, people's requirements for image quality have increased. The image enhancement technology is an image processing method that makes original unclear images sharp or emphasizes some interested features, suppresses uninterested features, improves image quality, enriches information, and strengthens image interpretation and recognition.

Under the background that Internet office technology has become the mainstream of office assistance, in more and more office scenarios, paper materials such as documents are required to be transmitted. Due to the lack of portability of scanners and the high requirements for the timeliness of data transmission, photographing paper documents through mobile phones has become the first choice for convenience. When using a mobile phone to photograph paper documents, because the accuracy of manual photographing is not as good as that of a scanner, and the actual lighting in the environment may not be ideal, there are many shortcomings in the image quality obtained by photographing. For instance, the uneven illumination of the image and the presence of shadows with different degrees of light and dark, and paper documents with white background color become different degrees of gray after imaging.

It thus can be seen that the captured image is not distinct enough due to insufficient contrast and noise interference. As a result, a poor image printing effect may be provided, and the content of the image may not be easily recognized. Therefore, it is necessary to convert the captured color or unclear image into a distinct and sharp black and white image to improve the printing effect of the image.

SUMMARY

The disclosure aims to provide an image processing method and system and a computer readable storage medium through which the problems of indistinct contrast, noise interference, and poor printing effect in a captured image found in the prior art are solved. The specific technical solution is provided as follow.

To accomplish the foregoing aim, the disclosure provides an image processing method including the following steps.

An image to be processed is obtained.

Grayscale processing is performed on the image to be processed to obtain a grayscale image, and blurring processing is performed on the image to be processed to obtain a first blurred image.

According to the grayscale image and the first blurred image, binarization processing is performed on the image to be processed to obtain a binarized image.

Expansion processing is performed on grayscale values of high-value pixel points in the binarized image to obtain an expanded image, where each of the high-value pixel points is a pixel point having the grayscale value greater than a first preset threshold.

Sharpening processing is performed on the expanded image to obtain a sharp image.

A contrast of the sharp image is adjusted to obtain a contrast image.

The grayscale image is used as a guided image to perform guided filter processing on the contrast image to obtain a target image.

Optionally, the method further includes the following steps.

Clearing processing is performed on a black region at edges of the target image.

Optionally, the step of performing the blurring processing on the image to be processed further includes the following step.

Gaussian blur is adopted to perform the blurring processing on the image to be processed.

Optionally, the step of performing the binarization processing on the image to be processed according to the grayscale image and the first blurred image further includes the following steps.

Following processing is performed on each pixel point in the image to be processed:

A difference value between a grayscale value corresponding to the pixel point in the grayscale image and a blur value corresponding to the pixel point in the first blurred image is calculated, and a pixel value of the pixel point in the image to be processed is set to 0 if the grayscale value is less than a third preset threshold, otherwise set to 255 when an absolute value of the difference value is less than a second preset threshold and the grayscale value is greater than or equal to the blur value.

The pixel value of the pixel point in the image to be processed is set to 255 if the grayscale value is greater than a fourth preset threshold, otherwise set to 0 when the grayscale value is less than the blur value.

The pixel value of the pixel point in the image to be processed is set to 0 if the grayscale value does not belong to the above two scenarios.

Optionally, a range of the third preset threshold is 35 to 75, and a range of the fourth preset threshold is 180 to 220.

Optionally, the step of performing the expansion processing on the grayscale values of the high-value pixel points in the binarized image further includes the following step.

Expansion processing is performed on the grayscale values of the high-value pixel points in the binarized image according to a preset expansion coefficient, where the preset expansion coefficient is 1.2 to 1.5.

Optionally, the first preset threshold is a sum of a mean grayscale value and a standard deviation of the grayscale value of the binarized image.

Optionally, the step of performing the sharpening processing on the expanded image to obtain the sharp image further includes the following steps.

The blurring processing is performed on the expanded image to obtain a second blurred image.

The second blurred image and the expanded image are mixed in proportion according to preset mixing coefficients to obtain the sharp image.

Optionally, the preset mixing coefficient of the expanded image is 1.5, and the preset mixing coefficient of the second blurred image is −0.5.

Optionally, the step of adjusting the contrast of the sharp image further includes the following step.

A grayscale value of each pixel point in the sharp image is adjusted according to a mean grayscale value of the sharp image.

Optionally, the step of adjusting the grayscale value of each pixel point in the sharp image further includes the following step.

The grayscale value of each pixel point in the sharp image is adjusted through a following formula:

$$f'(i,j) = \bar{f} + (f(i,j) - \bar{f}) * (1+t)$$

where f'(i, j) is the grayscale value of the pixel point (i, j) in the target image, $\bar{f}$ is the mean grayscale value of the sharp image, f(i, j) is the grayscale value of the pixel point (i, j) in the sharp image, and t is an intensity value.

Optionally, the intensity value is 0.1 to 0.5.

Optionally, the step of performing the clearing processing on the black region at edges of the target image further includes the following step.

Top, bottom, left, and right edges of the target image are traversed, and it is determined whether a black region with a width exceeding a fifth preset threshold exists, where the black region is removed if the black region exists.

Optionally, the step of traversing the top, bottom, left, and right edges of the target image and determining whether a black region with a width exceeding the fifth preset threshold exists further includes the following step.

Traversing is performed from two directions of rows and columns to determine whether a black region and edges of the black region exist for any one of the top, bottom, left, and right edges of the target image, so as to determine whether the width of the black region exceeds the fifth preset threshold.

Based on the same inventive concept, the disclosure further provides an image processing system, and the system includes a processor and a memory. The memory stores a command, and when the command is executed by the processor, the steps of an image processing method is implemented. The method includes the followings steps. An image to be processed is obtained. Grayscale processing is performed on the image to be processed to obtain a grayscale image, and blurring processing is performed on the image to be processed to obtain a first blurred image. According to the grayscale image and the first blurred image, binarization processing is performed on the image to be processed to obtain a binarized image. Expansion processing is performed on grayscale values of high-value pixel points in the binarized image to obtain an expanded image, where each of the high-value pixel points is a pixel point having the grayscale value greater than a first preset threshold. Sharpening processing is performed on the expanded image to obtain a sharp image. A contrast of the sharp image is adjusted to obtain a contrast image. The grayscale image is used as a guided image to perform guided filter processing on the contrast image to obtain a target image.

Based on the same inventive concept, the disclosure further provides a computer readable storage medium. The computer readable storage medium stores a command, and when the command is executed, the steps of an image processing method is implemented. The method includes the following steps. An image to be processed is obtained. Grayscale processing is performed on the image to be processed to obtain a grayscale image, and blurring processing is performed on the image to be processed to obtain a first blurred image. According to the grayscale image and the first blurred image, binarization processing is performed on the image to be processed to obtain a binarized image. Expansion processing is performed on grayscale values of high-value pixel points in the binarized image to obtain an expanded image, where each of the high-value pixel points is a pixel point having the grayscale value greater than a first preset threshold. Sharpening processing is performed on the expanded image to obtain a sharp image. A contrast of the sharp image is adjusted to obtain a contrast image. The grayscale image is used as a guided image to perform guided filter processing on the contrast image to obtain a target image.

Compared with the related art, the image processing method and system and the computer readable storage medium provided by the disclosure exhibit the following advantages:

In the disclosure, grayscale processing and blurring processing are respectively performed on the image to be processed to obtain the grayscale image and the first blurred image. Binarization processing is then performed on the image to be processed according to the grayscale image and the first blurred image to obtain the binarized image. Expansion processing is performed on the grayscale values of the high-value pixel points in the binarized image to obtain the expanded image. Sharpening processing and contrast adjustment are performed on the expanded image to obtain the contrast image, and the grayscale image is used as the guided image to perform guided filter processing on the contrast image to obtain the target image. In the disclosure, a color image or an unclear image may be converted into a grayscale image with a clear and sharp black-and-white contrast. Since the converted image has less noise interference and a clear black-and-white contrast, the recognition of the image content and the printing effect may be effectively improved.

BRIEF DESCRIPTION OF THE DRAWINGS

To make the technical solutions provided in the embodiments of the disclosure or the related art more clearly illustrated, several accompanying drawings required by the embodiments or the related art for description are briefly introduced as follows. Obviously, the drawings in the following description are merely some embodiments of the disclosure, and for a person having ordinary skill in the art, other drawings can be obtained based on these drawings without inventive effort.

FIG. 5 is a binarized image which is obtained after binarization processing is performed on the image to be processed shown in FIG. 2 according to the grayscale image shown in FIG. 3 and the first blurred image shown in FIG. 4.

FIG. 6 is an expanded image which is obtained after expansion processing is performed on the binarized image shown in FIG. 5.

FIG. 7 is a sharp image which is obtained after sharpening processing is performed on the expanded image shown in FIG. 6.

FIG. 8 is a contrast image which is obtained after contrast adjustment is performed on the sharp image shown in FIG. 7.

FIG. 9 is a target image which is obtained by using the grayscale image shown in FIG. 3 as a guided image to perform guided filter processing on the contrast image shown in FIG. 8.

FIG. 10 is an image which is obtained after clearing processing is performed on a black region at edges of the target image shown in FIG. 9.

DESCRIPTION OF THE EMBODIMENTS

An image processing method and system and a computer readable storage medium provided by the disclosure are further described in detail below with reference to the accompanying drawings and specific embodiments. According to the following description, the advantages and features of the disclosure will be clearer. It should be noted that the drawings all adopt a very simplified form and all use imprecise proportions, which are only used to conveniently and clearly assist in explaining the purpose of the embodiments of the disclosure. It should be noted that the structures, ratios, sizes, etc. shown in the accompanying drawings in the specification are only to be used together with the content disclosed in the specification for a person having ordinary skill in the art to comprehend and read, are not intended to limit the limiting conditions of the implementation of the disclosure, and therefore have no technical significance. Any structural modification, proportional relationship change, or size adjustment, without affecting the effects and objectives that can be achieved by the disclosure, should still fall within the scope of the technical content disclosed in the disclosure.

Figure 1:
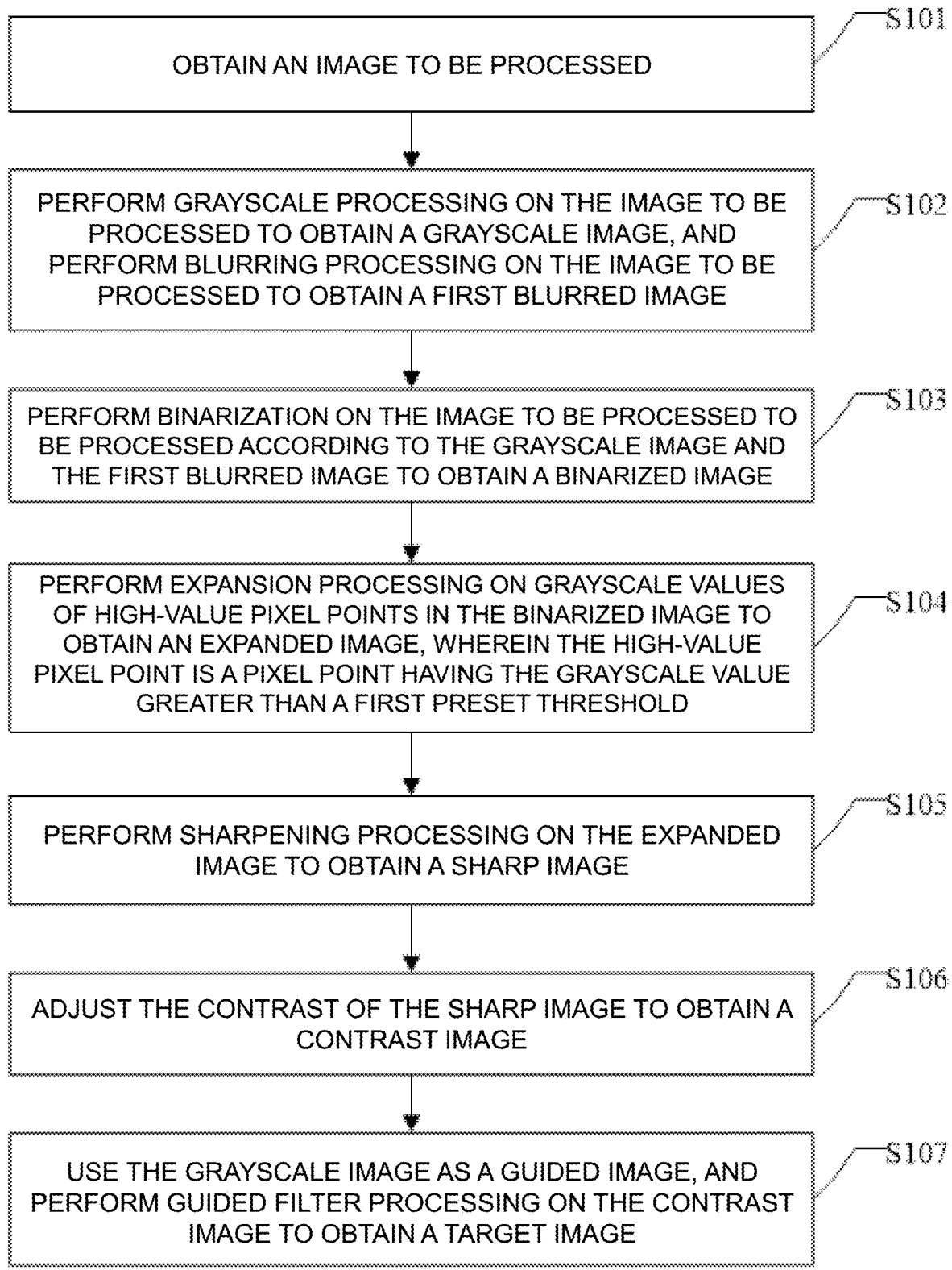
FIG. 1 is a schematic flow chart of an image processing method according to an embodiment of the disclosure.

FIG. 1 illustrates a flow chart of an image processing method according to an embodiment of the disclosure, and this method may be implemented in an application (app) installed on a smart terminal such as a mobile phone or a tablet computer. As shown in FIG. 1, the method includes the following steps.

In step S101, an image to be processed is obtained.

Figure 2:
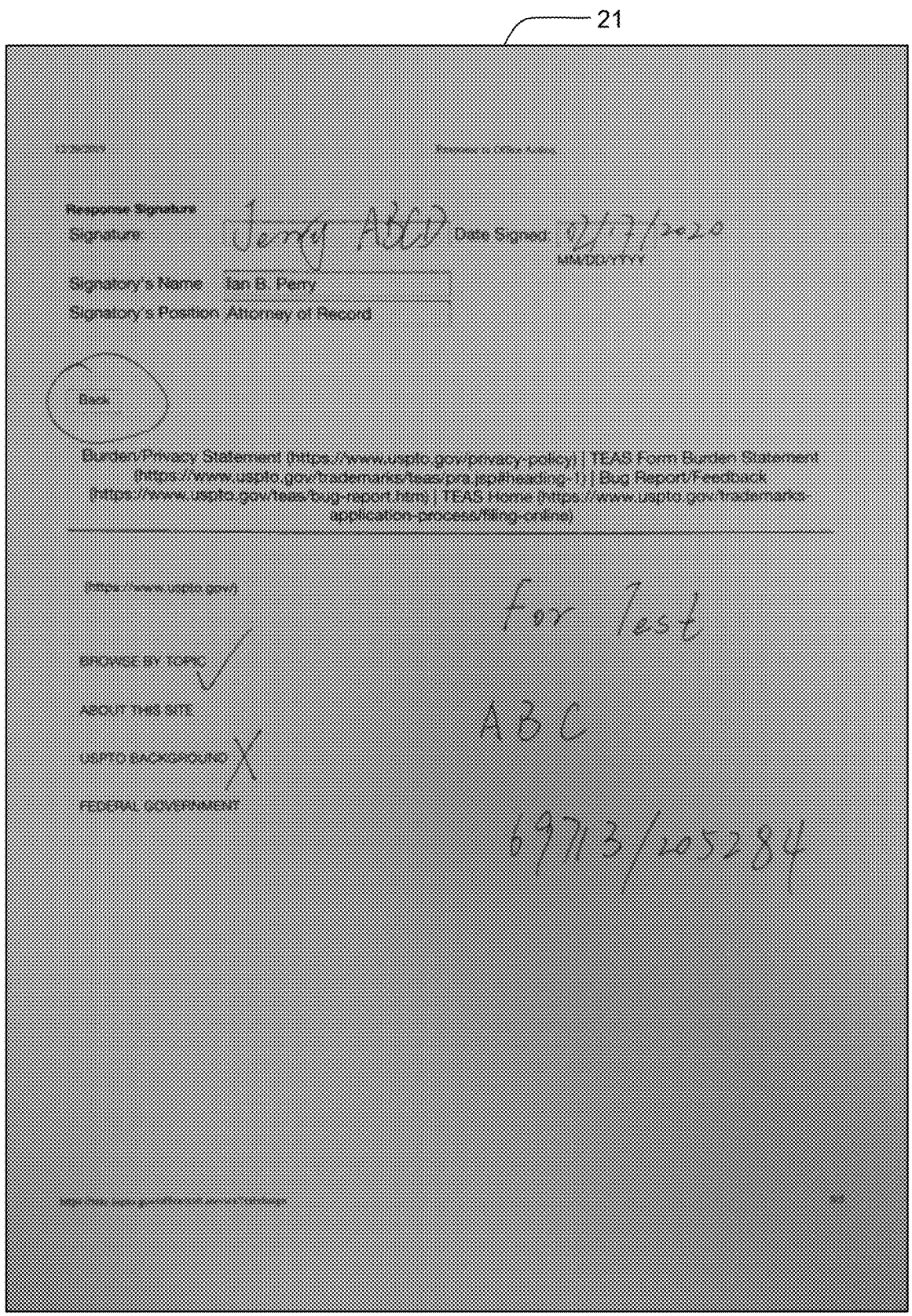
FIG. 2 is a specific example of an image to be processed according to the disclosure.

The image to be processed may be obtained by taking photos or scanning, and specifically may be previously stored by a user or captured by the user in real time. For instance, the image to be processed may be previously stored in a mobile device by the user or captured in real time by the user using an external camera connected to the mobile device or a built-in camera of the mobile device. In an embodiment, the user may also obtain the image to be processed in real time via a network. FIG. 2 is an example of the image to be processed 21. A contrast in the image is not obvious enough. If the image to be processed 21 shown in FIG. 2 is printed directly, an unfavorable printing effect may be provided. Therefore, subsequent processing is required to be performed on the image to be processed 21 shown in FIG. 2 to make the black and white contrast of the image obvious, thereby improving the printing effect.

In step S102, grayscale processing is performed on the image to be processed to obtain a grayscale image, and blurring processing is performed on the image to be processed to obtain a first blurred image.

In the image to be processed, three components of R, G, and B (R: Red, G: Green, and B: Blue), namely the three primary colors of red, green, and blue, are used to represent true colors. Value ranges of the R component, G component, and B component are all 0 to 255. When R=G=B, the color represents a grayscale color, and a value of R=G=B is called a grayscale value.

Grayscale methods include a component method, a maximum value method, an average method, and a weighted average method. Among them, the component method uses the brightness of the three components in the color image as the grayscale values of the three grayscale images, and a grayscale image may be selected according to application needs. The maximum method uses a maximum value of the three-component brightness in the color image as the grayscale value of the grayscale image. The average method is to average the three-component brightness in the color image to obtain a grayscale value.

The weighted average method is to weight and average the three components with different weights according to importance and other indicators. Since the human eye has the highest sensitivity to green and the lowest sensitivity to blue, the weighted average of the three components of R, G, and B may be obtained by the following formula to obtain a more reasonable grayscale image:

$$F(i,j)=0.30R(i,j)+0.59G(i,j)+0.11B(i,j)$$

where $F(i, j)$ is the grayscale value of the pixel point $(i, j)$ in the converted grayscale image, $R(i, j)$ is the R component of the pixel pint $(i, j)$ in the color image, $G(i, j)$ is the G component of the pixel point $(i, j)$ in the color image, and $B(i, j)$ is the B component of the pixel point $(i, j)$ in the color image.

Figure 3:
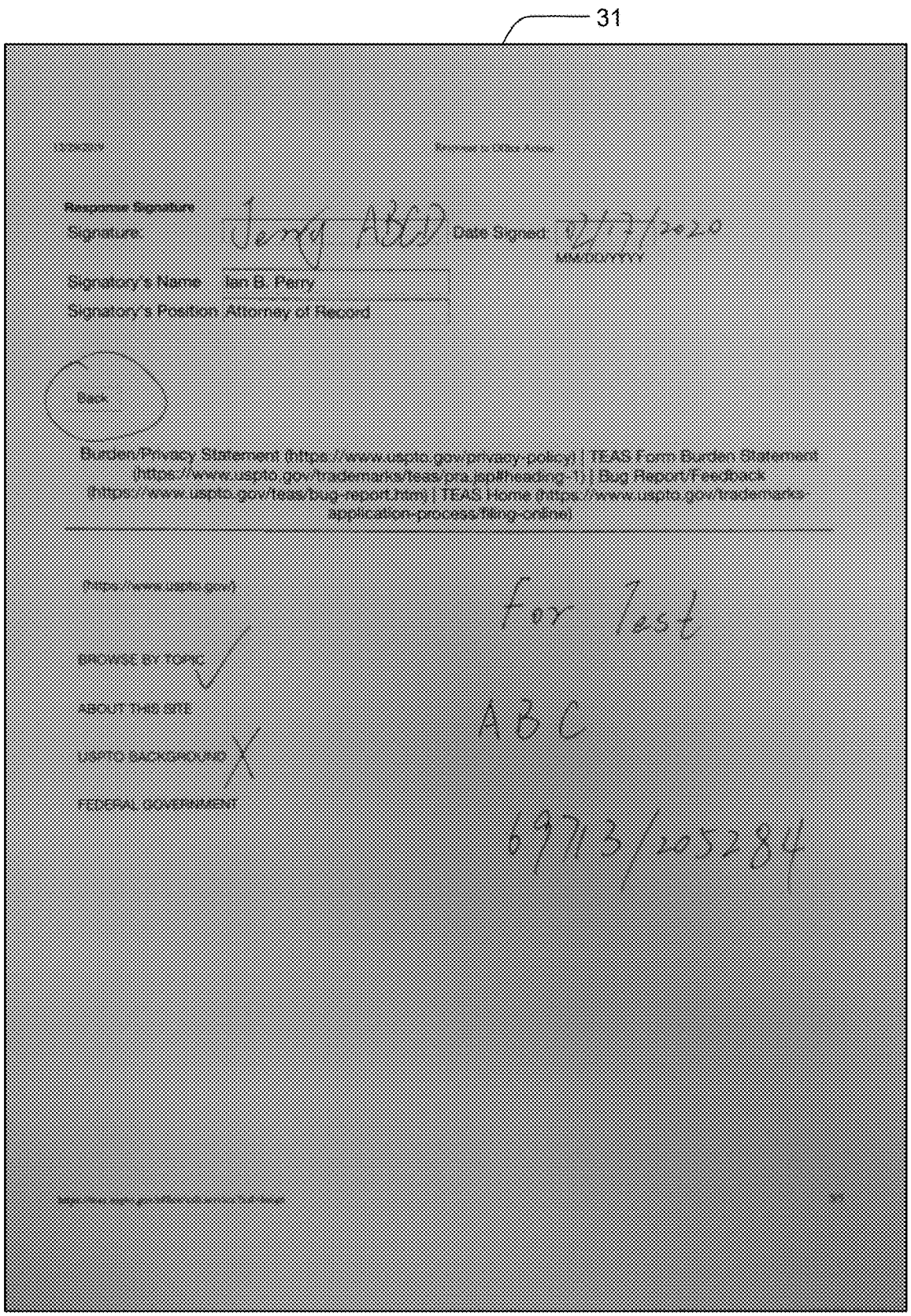
FIG. 3 is a grayscale image which is obtained after grayscale processing is performed on the image to be processed shown in FIG. 2.

In this embodiment, any one of the above four grayscale methods may be adopted to perform grayscale processing on the image to be processed to obtain a grayscale image. FIG. 3 is a grayscale image 31 which is obtained after grayscale processing is performed on the image to be processed 21 shown in FIG. 2.

Figure 4:
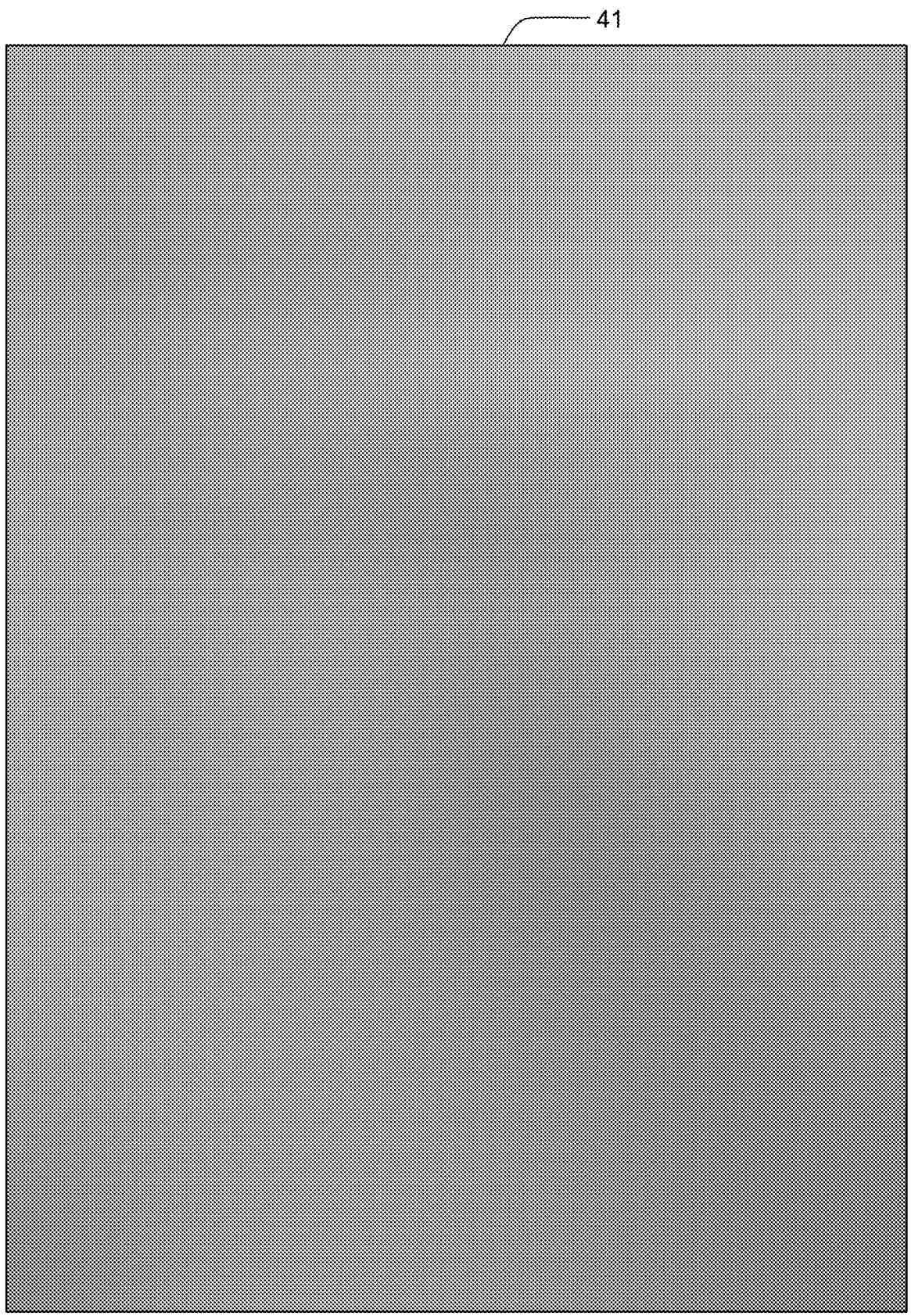
FIG. 4 is a first blurred image which is obtained after blurring processing is performed on the image to be processed shown in FIG. 2.

The blurring processing performed on an image mainly aims to soften the image and lighten borders of different colors in the image, so as to cover up the defects of the image or create special effects. Common blurring methods include motion blur, Gaussian blur, blur filter, blur more, radial blur, smart blur, and so on. In this embodiment, any one of these blurring methods may be adopted to perform blurring processing on the image to be processed to obtain a first blurred image. FIG. 4 is a first blurred image 41 which is obtained after blurring processing is performed on the image to be processed 21 shown in FIG. 2.

Among them, Motion Blur is to blur an image in a specified direction (−360 degrees to +360 degrees) with a specified intensity (1 to 999). The function of the Blur filter is to produce a slight blur effect, which may eliminate the noise in an image. If the effect is not obvious when being applied only once, this effect may be repeatedly applied. The blur effect produced by the Blur More is better than the blur effect produced by the blur filter, generally 3 to 4 times the effect of the blur filter. The function of the Radial Blur is to simulate the blur produced by a moving or rotating camera, including two blur modes: rotation and zooming. Rotation is to blur along concentric circles according to a specified rotation angle, and zooming is to produce a blur effect that is emitted from the center of an image to the surroundings. The function of the Smart Blur is to produce a variety of blur effects and weaken the sense of layering of an image, including three blur modes: normal mode, edge priority mode, and superimposed edge mode. The normal mode only blurs the image, the edge priority mode may outline a color boundary of the image, and the superimposed edge mode is a superimposition effect of the first two modes.

Preferably, Gaussian blur is adopted to perform the blurring processing on the image to be processed. Gaussian blur, also called Gaussian smoothing, is a processing effect widely used in image processing software such as Adobe Photoshop, GIMP, and Paint.NET. It is usually used to reduce image noise and reduce the level of detail. The visual effect of the image generated by this blur technology is like observing the image through a translucent screen, which is obviously different from the out-of-focus imaging effect of the lens and the effect in the shadow of ordinary lighting. Gaussian smoothing is also used in the pre-processing stage of computer vision algorithms to enhance the image effect of an image at different scales (see scale space representation and scale space implementation). From a mathematical point of view, Gaussian blur refers to the convolution of an image with a probability density function of a two-dimensional Gaussian distribution. The Gaussian blur process of the image is the convolution of the image and the normal distribution. Since the normal distribution is also called Gaussian distribution, this technique is called Gaussian blur. Convolution of the blurred image with a circular box may produce a more accurate out-of-focus imaging effect. Since the Fourier transform of the Gaussian function is another Gaussian function, the Gaussian blur is a low-pass filter for the image.

The Gaussian filter is a linear filter that can effectively suppress noise and smooth the image. Its principle of functioning is similar to that of an average filter, and both of them take the average value of the pixels in a filter window as the output. The coefficients of the window template and the average filter are different, and the template coefficients of the average filter are the same as 1. The template coefficient of the Gaussian filter decreases as a distance from the center of the template increases. Therefore, the Gaussian filter has a smaller degree of blurring of the image compared to the average filter.

The Gaussian filter is defined as:

$$GF_P = \sum_{P \in \Omega} G_s(\|p - t\|) I_p,$$

where $\Omega$ represents a neighborhood window, $I^p$ is a pixel value of a point p, $GF_p$ is an output pixel value corresponding to point p, $\|p-t\|$ represents the Euclidean distance between point p and point t, and $G_s$ is a spatial domain kernel function, which is defined as follows:

$$G_s = \frac{1}{2\pi\sigma_s^2} \exp\left(-\frac{\|I_p - I_t\|^2}{2\sigma_s^2}\right),$$

where $I_t$ is a pixel value at point t, $\sigma_s$ is a standard deviation of a spatial neighborhood, which represents a degree of dispersion of data. It is an important parameter of the Gaussian filter and determines the degree of blurring of the image performed by the Gaussian filter. When $\sigma_s$ decreases, the distribution of template coefficients is concentrated, the coefficients near the center of the template are greater, and the coefficients around the template are smaller, so the blurring effect on the image is weak. When $\sigma_s$ increases, the distribution of the template coefficients is scattered, and the coefficients at the center of the template are not much different from those around the template, so the blurring effect on the image is obvious.

In step S103, binarization processing is performed on the image to be processed according to the grayscale image and the first blurred image to obtain a binarized image.

Figure 5:
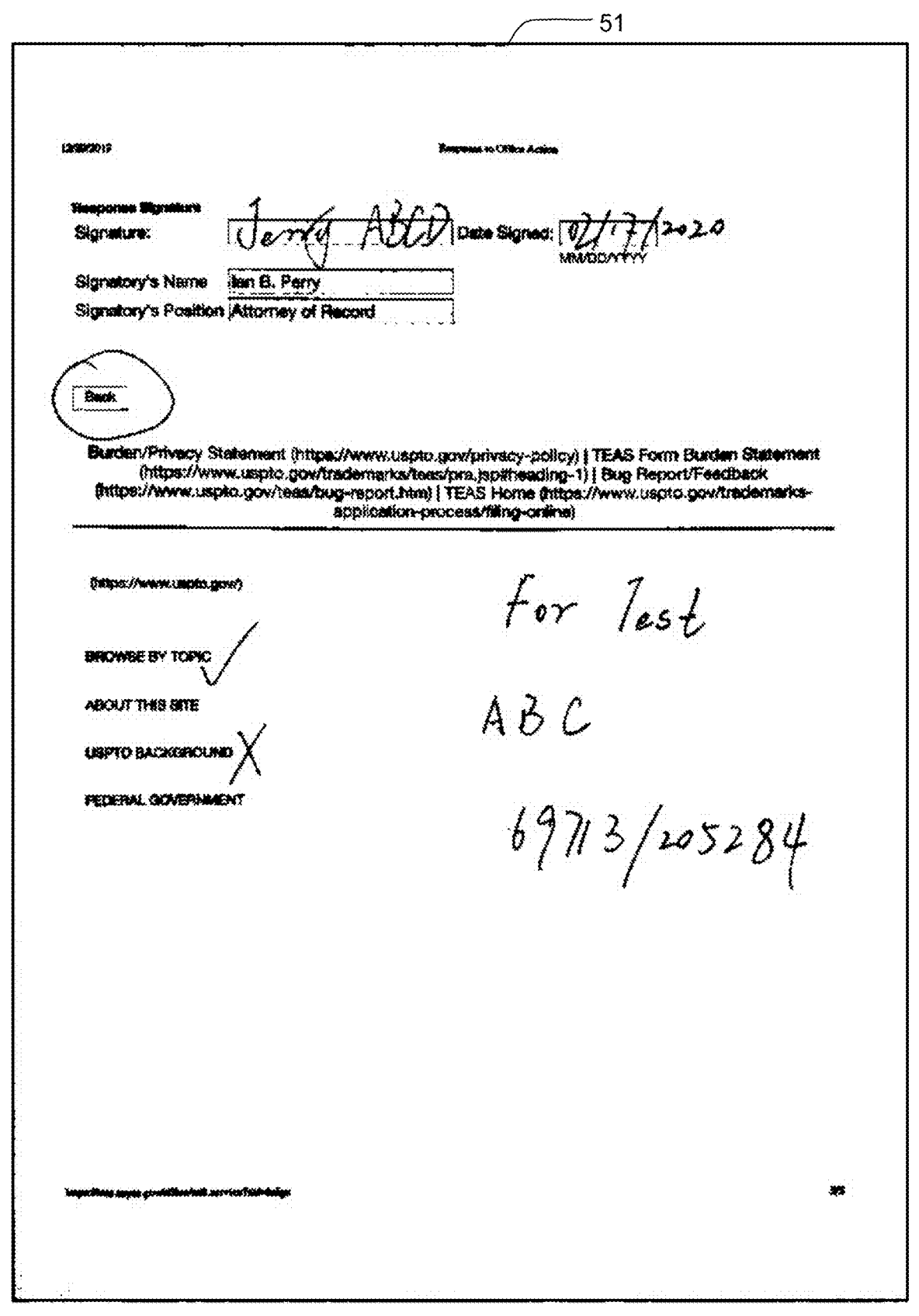

The binarization processing is the process of setting the grayscale values of the pixels on the image to 0 or 255, that is, the entire image is allowed to present an obvious black and white effect. The binarization of the image greatly reduces the amount of data in the image, so that a contour of a target may be highlighted. FIG. 5 is a binarized image 51 which is obtained after binarization processing is performed on the image to be processed 21 in FIG. 2 according to the grayscale image 31 in FIG. 3 and the first blurred image 41 in FIG. 4.

In this embodiment, the step of performing the binarization processing on the image to be processed according to the grayscale image and the first blurred image specifically includes the following: for each pixel point in the image to be processed, the following processing is performed:

A difference value between a grayscale value corresponding to the pixel point in the grayscale image and a blur value corresponding to the pixel point in the first blurred image is calculated, and when an absolute value of the difference value is less than a second preset threshold and the grayscale value is greater than or equal to the blur value, a pixel value of the pixel point in the image to be processed is set to 0 if the grayscale value is less than a third preset threshold, otherwise is set to 255.

When the grayscale value is less than the blur value, the pixel value of the pixel point in the image to be processed is set to 255 if the grayscale value is greater than a fourth preset threshold, otherwise is set to 0.

If the grayscale value does not belong to the above two scenarios, the pixel value of the pixel point in the image to be processed is set to 0.

Through the foregoing processing, the pixel value of each pixel in the image to be processed may be set to 0 or 255, and a binarized image is thereby obtained.

The second preset threshold may be set according to actual conditions, for example, set to 10. A range of the third preset threshold is 35-75, preferably 55, and a range of the fourth preset threshold is 180-220, preferably 200.

For any pixel, when an absolute value of a difference between a grayscale value GrayPixel and a blur value BlurPixel is less than 10 and the grayscale value is greater than or equal to the blur value (i.e., GrayPixel≥BlurPixe), if the grayscale value is less than 55 (i.e., GrayPixel<55), then the grayscale value of the pixel point in the image to be processed is set to black, and if the grayscale value is greater than or equal to 55 (i.e., GrayPixel≥55), the grayscale value of the pixel point in the image to be processed is set to white.

When the grayscale value GrayPixel is less than the blur value BlurPixel (i.e., GrayPixel<BlurPixe), if the grayscale value is greater than 200 (i.e., GrayPixel>200), the grayscale value of the pixel point in the image to be processed is set to white, and if the grayscale value is less than or equal to 200 (i.e., GrayPixel≤200), the grayscale value of the pixel point in the image to be processed is set to black.

If the grayscale value of the pixel point does not satisfy the above two scenarios, the pixel value of the pixel point in the image to be processed is then set to black.

In thus can be seen that, in this embodiment, all pixels in the image to be processed are divided into first-type pixel points, second-type pixel points, and third-type pixel points through the grayscale values of the pixel points in the grayscale image and the blur values of the pixel points in the first blurred image. Herein, the first-type pixel points satisfy the following condition: the absolute value of the difference between the grayscale value and the blur value is less than the second preset threshold, and the grayscale value is greater than or equal to the blur value. The second-type pixel points are pixels other than the first-type pixel points whose grayscale value is less than the blur value. The third-type pixel points are pixels other than the first-type pixel points and the second-type pixel points. For each of the first-type pixel points, if the grayscale value is less than the third preset threshold, the pixel value of the pixel point in the image to be processed is set to 0, otherwise is set to 255. For each of the second-type pixel points, if the grayscale value is greater than the fourth preset threshold, the pixel value of the pixel point in the image to be processed is set to 255, otherwise is set to 0. For each of the third-type pixel points, the pixel value of the pixel point in the image to be processed is set to 0.

In this embodiment, all pixels are divided into three types of pixels first, and for the first-type pixel points and the second-type pixel points, it is further determined whether they are to set to black or white. In this way, in the obtained binarized image, the distinction between the target and the background is more obvious, the contour of the target is more detailed and prominent, and the black and white enhancement effect is further improved. In other embodiments, the binarization processing may also be performed on the grayscale image to obtain the same binarized image according to the first blurred image as well. Specific implementation may be found with reference to the foregoing description, and description thereof is thus not repeated herein.

In step S104, expansion processing is performed on grayscale values of high-value pixel points in the binarized image to obtain an expanded image, where each of the high-value pixel points is a pixel point having the grayscale value greater than a first preset threshold.

Preferably, the first preset threshold is a sum of a mean grayscale value of the binarized image and a standard deviation of the grayscale value of the binarized image. That is, the first preset threshold is equal to the mean grayscale value of the binarized image plus the standard deviation of the grayscale value of the binarized image.

In this step, expansion processing may be performed on the grayscale values of the high-value pixel points in the binarized image according to a preset expansion coefficient. That is, the grayscale value of each high-value pixel point is multiplied by the preset expansion coefficient to perform expansion processing on the grayscale value of the high-value pixel point, so that an expanded image with a more obvious black and white contrast is obtained.

Figure 6:
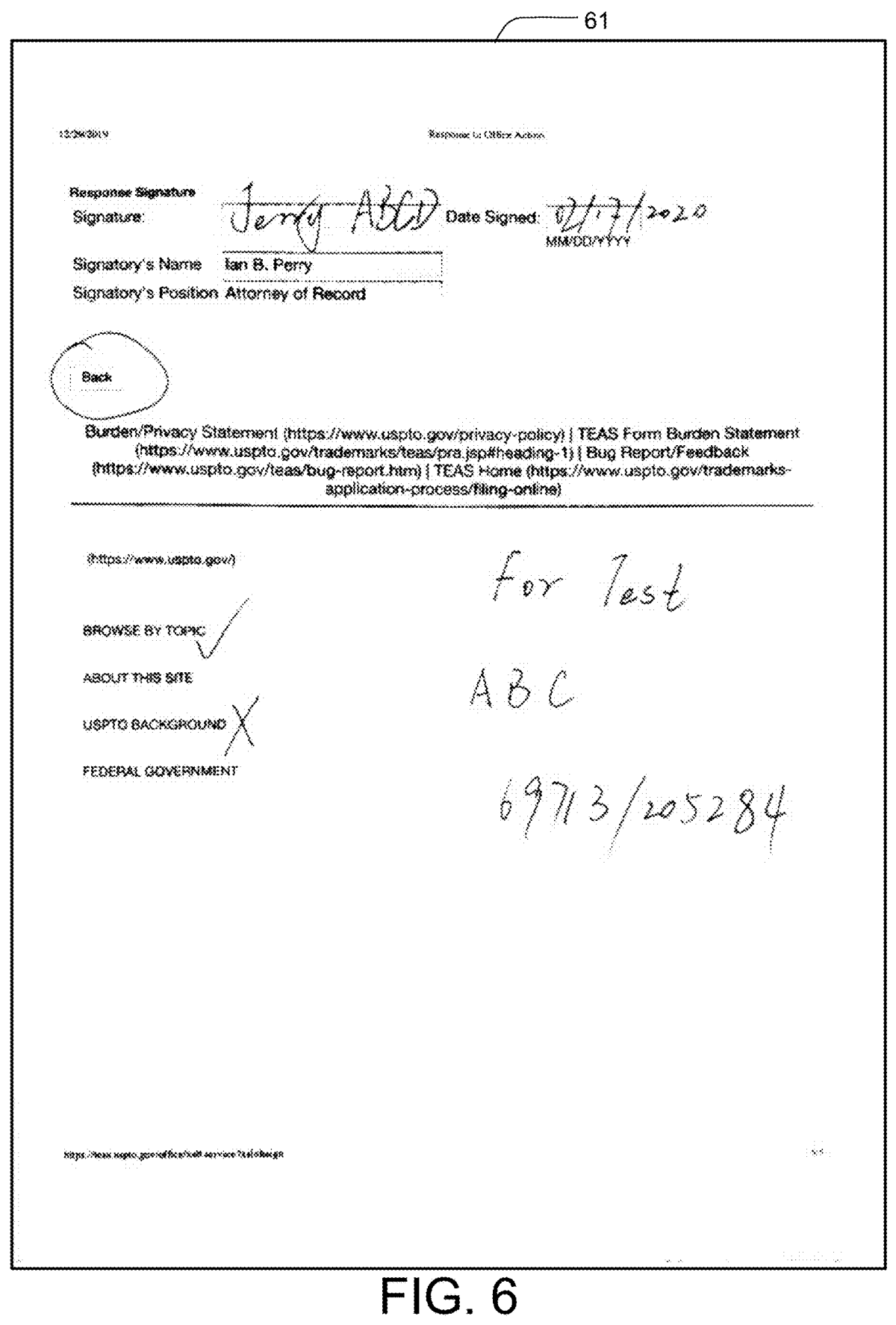

Herein, the preset expansion coefficient is 1.2 to 1.5. Preferably, the preset expansion coefficient is 1.3, so the grayscale value of each high-value pixel point in the binarized image is multiplied by 1.3, so that an expanded image with a more obvious black and white contrast is obtained. FIG. 6 is an expanded image 61 which is obtained after expansion processing is performed on the binarized image 51 shown in FIG. 5.

In step S105, sharpening processing is performed on the expanded image to obtain a sharp image.

Figure 7:
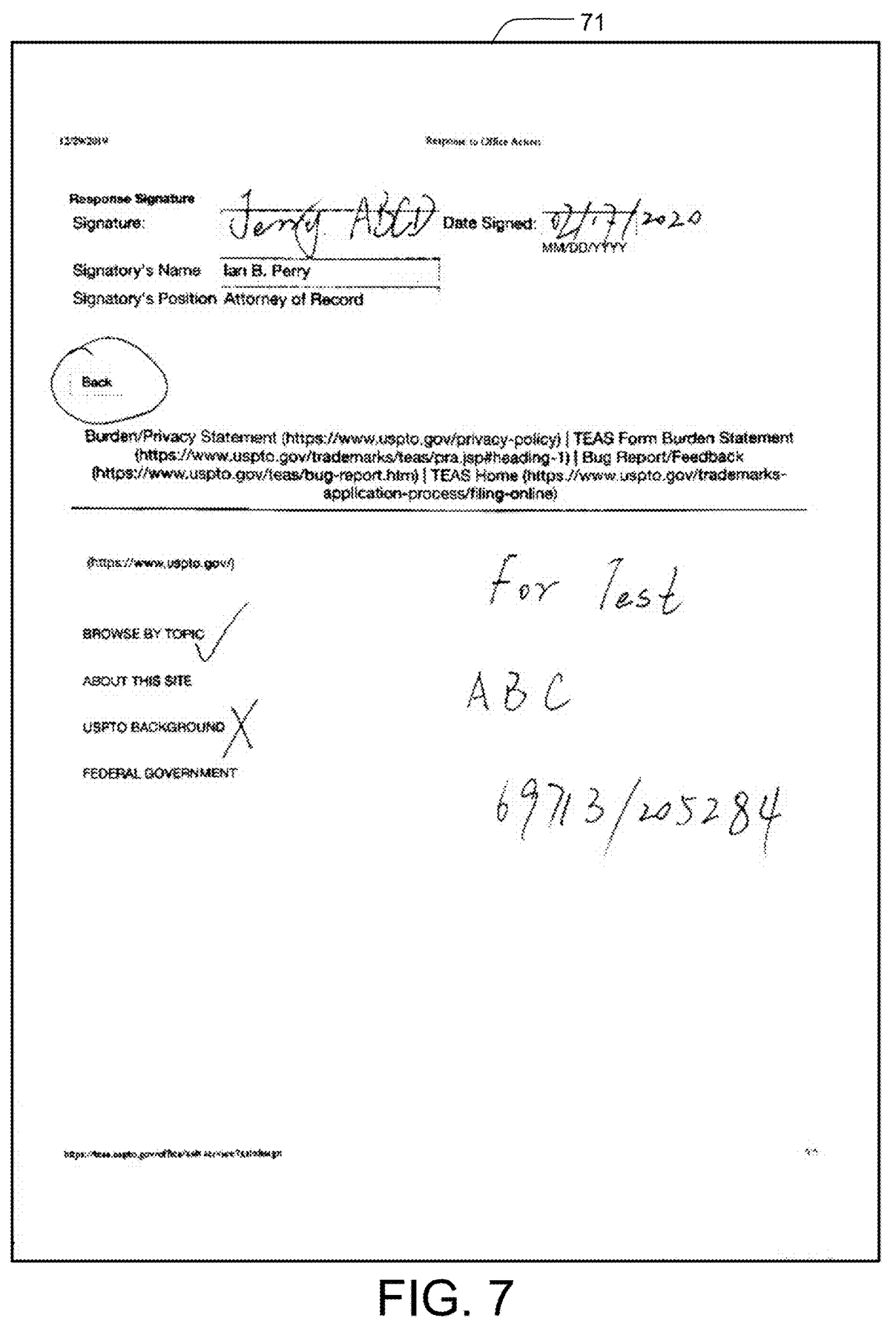

In this step, through the sharpening processing performed on the expanded image, a sharp image sharper than the expanded image may be obtained. FIG. 7 is a sharp image 71 which is obtained after sharpening processing is performed on the expanded image 61 shown in FIG. 6.

Preferably, the step of performing the sharpening processing on the expanded image to obtain the sharp image further includes the following steps.

The blurring processing is performed on the expanded image to obtain a second blurred image. The second blurred image and the expanded image are mixed in proportion according to preset mixing coefficients to obtain the sharp image.

It is assumed that $f_1(i, j)$ is the grayscale value of pixel point $(i, j)$ in the expanded image, $f_2(i, j)$ is the grayscale value of the pixel point $(i, j)$ in the second blurred image, $f_3(i, j)$ is the grayscale value of the pixel point $(i, j)$ in the sharp image, $k_1$ is the preset mixing coefficient of the expanded image, and $k_2$ is the preset mixing coefficient of the second blurred image, then a relationship among $f_1(i, j)$, $f_2(i, j)$, and $f_3(i, j)$ is as follows: $f_3(i, j)=k_1 f_1(i, j)+k_2 f_2(i, j)$.

Preferably, the preset mixing coefficient of the expanded image is 1.5, and the preset mixing coefficient of the second blurred image is −0.5. As such, the grayscale value of the pixel point $(i, j)$ in the sharp image is: $f_3(i, j)=1.5 f_1(i, j)−0.5 f_2(i, j)$.

The method of performing blurring processing on the expanded image is identical to the method of performing blurring processing on the image to be processed, so description thereof is not repeated herein. Preferably, Gaussian blur may be adopted to perform the blurring processing on the expanded image.

In step S106, a contrast of the sharp image may be adjusted to obtain a contrast image.

Figure 8:
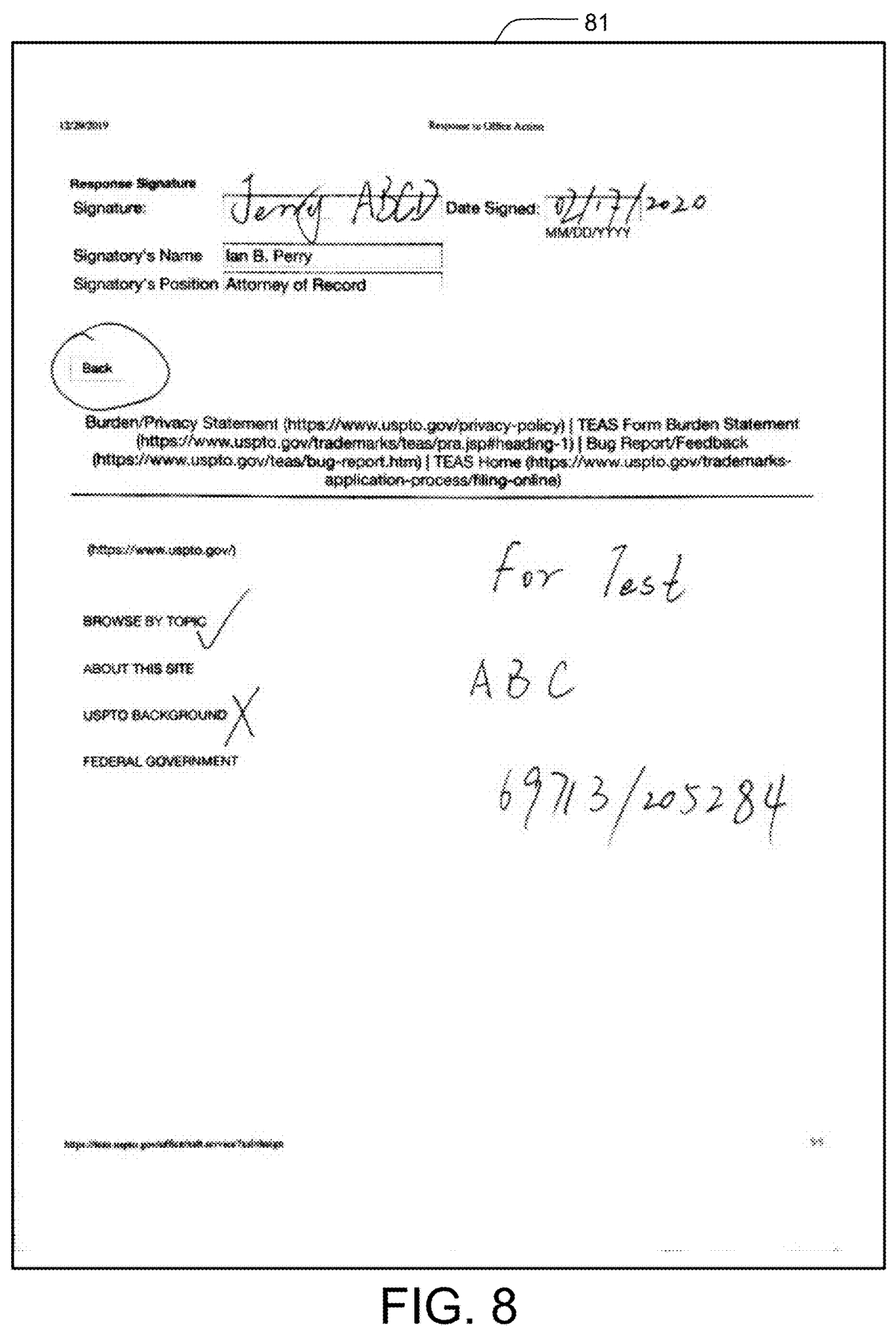

In this step, by adjusting the contrast of the sharp image, a contrast image with a more obvious black and white contrast may be obtained. FIG. 8 is a contrast image 81 which is obtained after contrast adjustment is performed on the sharp image 71 shown in FIG. 7.

In this embodiment, the grayscale value of each pixel point in the sharp image may be adjusted according to the mean grayscale value of the sharp image. To be specific, the grayscale value of each pixel point in the sharp image may be adjusted through a following formula: $f'(i,j)=\bar{f}+(f(i,j)−\bar{f})*(1+t))$ wherein $f'(i, j)$ is the grayscale value of the pixel point $(i, j)$ in the target image, $\bar{f}$ is the mean grayscale value of the sharp image, $f(i, j)$ is the grayscale value of the pixel point $(i, j)$ in the sharp image, and t is an intensity value. Therefore, the grayscale value of each pixel point of the sharp image may be adjusted according to the above formula, so that a contrast image with a more obvious black and white contrast is obtained.

Herein, the intensity value may be 0.1 to 0.5, and preferably 0.2. The specific value of the intensity value may be selected according to the final black and white enhancement effect to be achieved.

In step S107, the grayscale image is used as a guided image to perform guided filter processing on the contrast image to obtain a target image.

Filters are widely used in image smoothing, denoising, and beautifying. At present, common filters include mean filters, median filters, Gaussian filters, bilateral filters, and guided filters. The implementation steps of these filters are roughly the same, and the specific process is as follows:

1) An m×n template (m and n are usually odd numbers) is constructed, and then the template is moved in an image so that a center of the template coincides with each pixel point in turn (except for edge pixel points).

2) A pixel value of the corresponding pixel point is subtracted from each coefficient in the template one by one, and all the results are added (other operations may also be applied).

3) The pixel value of the pixel point corresponding to the center position of the template in the image is the calculation result of the previous step.

Guided filtering is to perform filtering processing on the target image (input image) through a guide map, so that the final output image is approximately similar to the input image, and the edge texture is similar to the guide map. The guided filter may be used as an edge-preserving smoothing operator just like a bilateral filter, but it has a better processing effect on image edges and is currently one of the fastest edge-preserving filters.

The basic principle of guided filtering is as follows:

First, a local linear model is introduced, and the model includes a guided image I, an input image p, and an output image q. The guided image I and the input image p may be the same image or different images. It is assumed that the output image q and the guided image I have a linear relationship as follows: $q_i = a_k I_i + b_k$, $\forall i \in \omega_k$, where the coefficients $a_k$ and $b_k$ remain unchanged in the window $\omega_k$. It is assumed that the radius of the window $\omega_k$ is r, derivatives of both sides of the above formula are computed at the same time, and $\nabla q = a \nabla I$ is thereby obtained, so the above formula may ensure that the edges of the output image q is similar to the edges of the guide map I.

In order to determine the coefficients $a_k$ and $b_k$, a constraint condition is required to be introduced. Assuming that the output image q is obtained by subtracting unnecessary texture and noise n from the input image p, there is the following formula: $q_i = p_i - n_i$.

In order to minimize the difference between the output image q and the input image p, the following cost function is introduced: $E(a_k, b_k) = \Sigma_{i \in \omega_k}(a_k I_i + b_k - p_i)^2 + \varepsilon a_k^2)$, where $\varepsilon$ is a regularization parameter, the cost function is minimized, and the expressions of $a_k$ and $b_k$ are obtained:

$$a_k = \frac{\frac{1}{|\omega|}\sum_{i \in \omega_k} I_i p_i - \mu_k \overline{p}_k}{\sigma_k^2 + \varepsilon} \text{ and}$$

$$b_k = \overline{p}_k - a_k \mu_k,$$

where $\mu_k$ and $\sigma_k^2$ are respectively the mean value and variance of the guided image I in the window $\omega_k$, and $|\omega|$ is the number of pixel points in the window $\omega_k$. After $a_k$ and $b_k$ are obtained, the output pixel point $q_i$ may be calculated. The pixel point i participates in the calculation of all the windows that include it, so the $q_i$ calculated by different windows is different, and averaging is performed to obtain the following formula:

$$q_i = \frac{1}{|\omega|} \sum_{k \backslash i \in \omega_k} (a_k I_i + b_k).$$

Due to the symmetry of the window, the above formula may be rewritten as: $q_i = \overline{a}_i I_i + \overline{b}_i$, $\forall i \in \omega_k$, where $$\overline{a}_i = \frac{1}{\omega}\sum_{k \in \omega_i} a_k \text{ and } \overline{b}_i = \frac{1}{\omega}\sum_{k \in \omega_i} b_k$$

are the average values in the window $\omega_k$.

Figure 9:
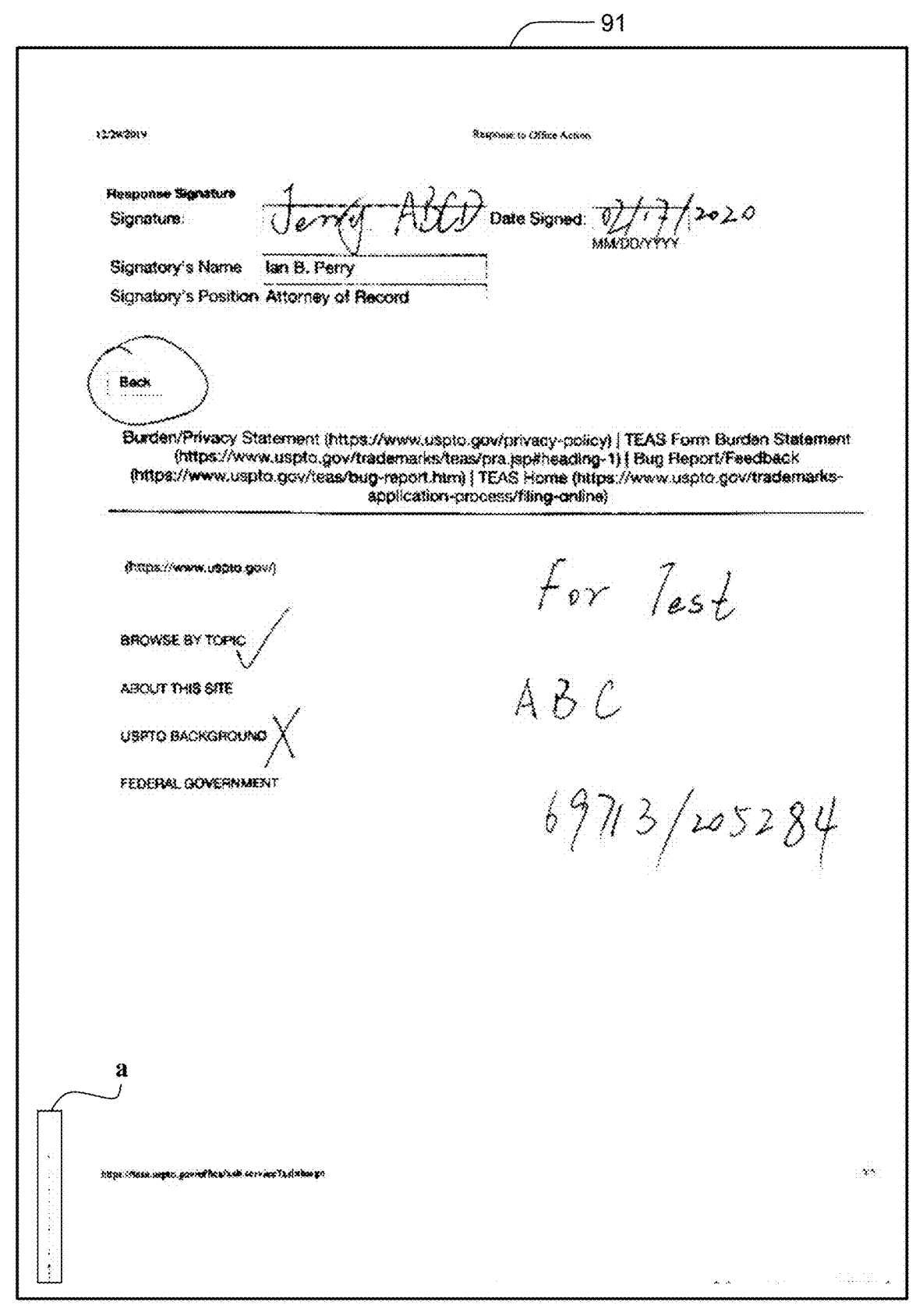

In this step, the grayscale image is the guided image, the contrast image is the input image, and the target image is the output image. Therefore, by performing filtering processing on the contrast image through the grayscale image, a target image that is substantially similar to the contrast image and whose edge texture is similar to the grayscale image may be outputted. After filtering, the noise in the image is significantly reduced. FIG. 9 is a target image 91 which is obtained by using the grayscale image 31 shown in FIG. 3 as a guided image to perform guided filter processing on the contrast image 81 shown in FIG. 8.

Further, after the target image is obtained in step S107, clearing processing may further be performed on a black region at edges of the target image. A large black region may be provided at the edges of the target image obtained through the above-mentioned steps. For instance, at least one of the top, bottom, left, and right edges of the image has a black region, so this black region is required to be removed.

In this embodiment, the top, bottom, left, and right edges of the target image may be traversed, and is determined whether a black region with a width exceeding a fifth preset threshold exists, where the black region is removed if the black region exists. That is, a continuous black region is found from the four edges of the target image. When the width of the black region exceeds the fifth preset threshold, it is considered to be a black region that needs to be cleared. At this time, the black region is removed, that is, the pixel value of each pixel point in the black region is set to white.

To be specific, traversing is performed from two directions of rows and columns to determine whether a black region and edges of the black region exist for any one of the top, bottom, left, and right edges of the target image, so as to determine whether the width of the black region exceeds the fifth preset threshold. For instance, a scan line function may be used to traverse from the edges of the image row by row and column by column until the pixel value of the pixel point is not black (that is, the edges of the black region are traversed at this time), so that the black region and the edges of the black region are found.

Figure 10:
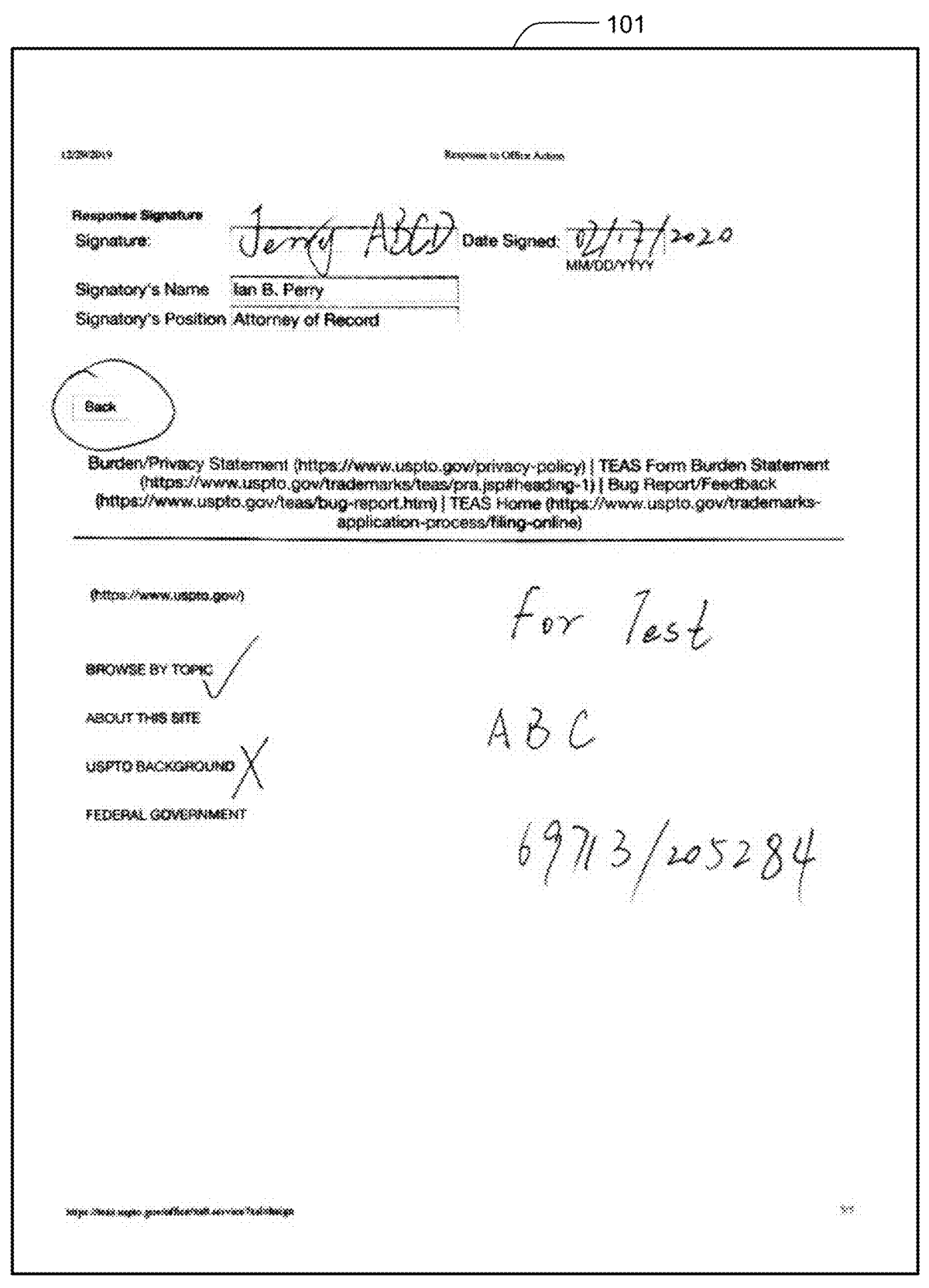

FIG. 10 is an image 101 which is obtained after clearing processing is performed on a black region at the edges of the target image 91 shown in FIG. 9, in which the black region in the lower left corner region a in the target image 91 shown in FIG. 9 is removed in the image 101 shown in FIG. 10.

Optionally, after the step of obtaining the image to be processed and before performing grayscale processing on the image to be processed in the image processing method provided by the disclosure, the following step is further included: determining whether the image to be processed is a grayscale image.

After the image to be processed is obtained, it is determined first whether the image to be processed is a grayscale image. If the image to be processed is a grayscale image, there is no need to perform grayscale processing on the image to be processed. Therefore, when the image to be processed is a grayscale image, the number of steps may be reduced, and the processing speed of the image may be effectively increased.

Comparing the image to be processed 21 shown in FIG. 2 and the image 101 shown in FIG. 10, it can be seen that after processing the image to be processed by using the method provided by the disclosure, the target image obtained has a more obvious black and white contrast than the image to be processed. Further, noise interference is significantly reduced, the image is clearer, and the image content is easier to be recognized. The printing effect of the image shown in FIG. 10 is significantly better than the printing effect of the image shown in FIG. 2.

In view of the foregoing, in the image processing method provided by the disclosure, grayscale processing and blurring processing are respectively performed on the image to be processed to obtain the grayscale image and the first blurred image. Binarization processing is then performed on the image to be processed according to the grayscale image and the first blurred image to obtain the binarized image. Expansion processing is performed on the grayscale values of the high-value pixel points in the binarized image to obtain the expanded image. Sharpening processing and contrast adjustment are performed on the expanded image to obtain the contrast image, and the grayscale image is used as the guided image to perform guided filter processing on the contrast image to obtain the target image. In the disclosure, a color image or an unclear image may be converted into a grayscale image with a clear and sharp black-and-white contrast. Since the converted image has less noise interference and a clear black-and-white contrast, the recognition of the image content and the printing effect may be effectively improved.

Figure 11:
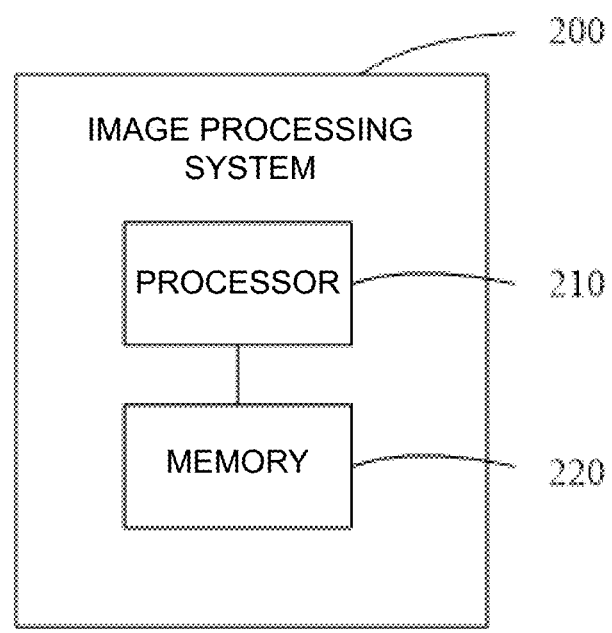
FIG. 11 is a schematic view of a structure of an image processing system according to an embodiment of the disclosure.

Based on the same inventive concept, the disclosure further provides an image processing system. As shown in FIG. 11, an image processing system 200 may include a processor 210 and a memory 220. The memory 220 stores a command, and the steps of the abovementioned image processing method are implemented when the command is executed by the processor 210.

Herein, the processor 210 may perform various actions and processing according to commands stored in the memory 220. To be specific, the processor 210 may be an integrated circuit chip with signal processing capabilities. The processor may be a general-purpose processor, a digital signal processor (DSP), an application specific integrated circuit (ASIC), a field programmable gate array (FPGA), or other components such as a programmable logic device, a discrete gate, a transistor logic device, and a discrete hardware component. The processor may implement or execute various methods, steps, and logical block diagrams disclosed in the embodiments of the disclosure. The general-purpose processor may be a microprocessor, or the processor may be any conventional processor, etc., and may be an X86 architecture or an ARM architecture.

The memory 220 stores an executable command, which is executed by the processor 210 in the image processing method described above. The memory 220 may be a volatile memory or a non-volatile memory and may also include both the volatile memory and non-volatile memory. The non-volatile memory may be a ready-only memory (ROM), a programmable ROM (PROM), an erasable PROM (EPROM), an electrically EPROM (EEPROM), or a flash memory. The volatile memory may be a random access memory (RAM) used as an external cache. By way of exemplary but not restrictive description, many forms of the RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that the memory of the method described herein is intended to include but not limited to these and any other suitable types of memories.

Based on the same inventive concept, the disclosure also provides a computer-readable storage medium, and the computer-readable storage medium stores a command. When the command is executed, the steps in the image processing method described above may be implemented.

Similarly, the computer readable storage medium in the embodiments of the disclosure may be a volatile memory or a non-volatile memory or may include both the volatile memory and the non-volatile memory. It should be noted that the computer readable storage medium as described herein is intended to include but not limited to these and any other suitable types of memories.

Note that the flow charts and block diagrams in the accompanying drawings show the possible implementation architecture, functions, and operations of the system, method, and computer program product according to the various embodiments of the disclosure. In this regard, each block in the flow charts or block diagrams may represent a module, a program segment, or a part of a code, and the module, the program segment, or the part of the code contains one or more executable commands for implementing the specified logic function. It should also be noted that in some alternative implementations, the functions marked in the blocks may also occur in a different order than the order marked in the drawings. For instance, two consecutive blocks may actually be executed substantially in parallel, or they may sometimes be executed in a reverse order, depending on the functions involved. It should also be noted that each block in the block diagrams and/or flow charts and the combination of the blocks in the block diagrams and/or flow charts may be implemented by a dedicated hardware-based system that performs specified functions or actions, or may be implemented by a combination of dedicated hardware and computer instructions.

Generally, the various exemplary embodiments of the disclosure may be implemented in hardware or dedicated circuits, software, firmware, logic, or any combination thereof. In some aspects, the embodiments may be implemented in hardware, while in other aspects, the embodiments may be implemented in firmware or software that can be executed by a controller, microprocessor, or other computing device. When various aspects of the embodiments of the disclosure are illustrated or described as block diagrams, flow charts, or using some other graphical representation, it may be understood that the blocks, devices, systems, technique, or method described herein may be implemented as non-limiting examples in hardware, software, firmware, dedicated circuits, logic, general-purpose hardware, controllers, other computing devices, or some combinations thereof.

It should be noted that the various embodiments in this specification are described in a related manner, and the same or similar parts between the various embodiments may be referred to each other. Each embodiment focuses on the differences from other embodiments. In particular, as for the system and the computer readable storage medium, since they are basically similar to the method embodiments, the description is relatively simple, and for related parts, please refer to the part of the description of the method embodiments.

In the specification, relational terms such as first and second are only used to indicate the distinction between an entity or operation and another entity or operation, and do not necessarily require or imply any such actual relationship or order between these entities or operations. Moreover, the terms "including", "comprising", or any other variations thereof are intended to cover non-exclusive inclusion, so that a process, method, object, or device including a series of elements includes not only those elements, but also other elements that are not explicitly listed, or includes elements inherent to the process, method, object, or device. If there are no more restrictions, the element defined by the sentence "including a . . . " does not exclude the existence of other identical elements in the process, method, article, or device that includes the element.

The foregoing description is only a description of the preferred embodiments of the disclosure, and does not limit the scope of the disclosure in any way. Any changes or modifications made by a person having ordinary skill in the art of the disclosure based on the foregoing disclosure shall fall within the protection scope of the claims.

What is claimed is:

1. An image processing method, characterized by-comprising:
   obtaining an image to be processed;
   performing a grayscale processing on the image to be processed to obtain a grayscale image and performing a blurring processing on the image to be processed to obtain a first blurred image;
   performing a binarization processing on the image to be processed according to the grayscale image and the first blurred image to obtain a binarized image;
   performing an expansion processing on grayscale values of high-value pixel points in the binarized image to obtain an expanded image, wherein each of the high-value pixel points is a pixel point having the grayscale value greater than a first preset threshold;
   performing a sharpening processing on the expanded image to obtain a sharp image;
   adjusting a contrast of the sharp image to obtain a contrast image; and
   using the grayscale image as a guided image to perform a guided filter processing on the contrast image to obtain a target image.

2. The image processing method according to claim 1, wherein the step of performing the blurring processing on the image to be processed further comprises:
   adopting Gaussian blur to perform the blurring processing on the image to be processed.

3. The image processing method according to claim 1, wherein the step of performing the binarization processing on the image to be processed according to the grayscale image and the first blurred image further comprises:
   performing following processing on each pixel point in the image to be processed:
      calculating a difference value between a grayscale value corresponding to the pixel point in the grayscale image and a blur value corresponding to the pixel point in the first blurred image and setting a pixel value of the pixel point in the image to be processed to 0 if the grayscale value is less than a third preset threshold, otherwise setting the pixel value of the pixel point in the image to be processed to 255, when an absolute value of the difference value is less than a second preset threshold and the grayscale value is greater than or equal to the blur value;
      setting the pixel value of the pixel point in the image to be processed to 255 if the grayscale value is greater than a fourth preset threshold, otherwise setting the pixel value of the pixel point in the image to be processed to 0, when the grayscale value is less than the blur value; and
      setting the pixel value of the pixel point in the image to be processed to 0 if the grayscale value does not belong to above two scenarios.

4. The image processing method according to claim 3, wherein a range of the third preset threshold is 35 to 75, and a range of the fourth preset threshold is 180 to 220.

5. The image processing method according to claim 1, wherein the step of performing the expansion processing on the grayscale values of the high-value pixel points in the binarized image further comprises:
   performing the expansion processing on the grayscale values of the high-value pixel points in the binarized image according to a preset expansion coefficient, wherein the preset expansion coefficient is 1.2 to 1.5.

6. The image processing method according to claim 1, wherein the first preset threshold is a sum of a mean grayscale value and a standard deviation of the grayscale value of the binarized image.

7. The image processing method according to claim 1, wherein the step of performing the sharpening processing on the expanded image to obtain the sharp image further comprises:
   performing the blurring processing on the expanded image to obtain a second blurred image; and
   mixing the second blurred image and the expanded image in proportion according to preset mixing coefficients to obtain the sharp image.

8. The image processing method according to claim 7, wherein the preset mixing coefficient of the expanded image is 1.5, and the preset mixing coefficient of the second blurred image is −0.5.

9. The image processing method according to claim 1, wherein the step of adjusting the contrast of the sharp image further comprises:
   adjusting a grayscale value of each pixel point in the sharp image according to a mean grayscale value of the sharp image.

10. The image processing method according to claim 9, wherein the step of adjusting the grayscale value of each pixel point in the sharp image further comprises:
    adjusting the grayscale value of each pixel point in the sharp image through a following formula:

$f'(i,j)=\bar{f}+(f(i,j)-\bar{f})*(1+t)$, wherein f'(i, j) is a grayscale value of a pixel point (i, j) in the target image, is the mean grayscale value of the sharp image, f(i, j) is a grayscale value of a pixel point (i, j) in the sharp image, and t is an intensity value.

11. The image processing method according to claim 10, wherein the intensity value is 0.1 to 0.5.

12. The image processing method according to claim 1, further comprising:
    performing a clearing processing on a black region at edges of the target image.

13. The image processing method according to claim 12, wherein the step of performing the clearing processing on the black region at edges of the target image further comprises:
    traversing top, bottom, left, and right edges of the target image and determining whether a black region with a width exceeding a fifth preset threshold exists, wherein the black region is removed if the black region with the width exceeding the fifth preset threshold exists.

14. The image processing method according to claim 13, wherein the step of traversing the top, bottom, left, and right edges of the target image and determining whether the black region with the width exceeding the fifth preset threshold exists further comprises:
  traversing from two directions of rows and columns to determine whether the black region and edges of the black region exist for any one of the top, bottom, left, and right edges of the target image, so as to determine whether the width of the black region exceeds the fifth preset threshold.

15. An image processing system, comprising a processor and a memory, wherein the memory stores a command, and the steps of the image processing method according to claim 1 is implemented when the command is executed by the processor.

16. A non-transitory computer readable storage medium, storing a command, wherein the steps of the image processing method according to claim 1 is implemented when the command is executed.

\* \* \* \* \*